United States Patent
Watanabe

(10) Patent No.: US 6,885,159 B2
(45) Date of Patent: Apr. 26, 2005

(54) LIGHT EMITTING DEVICE DRIVE AND IMAGE FORMING APPARATUS

(75) Inventor: Shinichi Watanabe, Kanagawa (JP)

(73) Assignee: Sony Corporation (JP)

( * ) Notice: Subject to any disclaimer, the term of this patent is extended or adjusted under 35 U.S.C. 154(b) by 9 days.

(21) Appl. No.: 10/395,067

(22) Filed: Mar. 25, 2003

(65) Prior Publication Data

US 2003/0218433 A1 Nov. 27, 2003

(30) Foreign Application Priority Data

Mar. 29, 2002 (JP) ........................................ 2002-095083

(51) Int. Cl.[7] .............................................. G05F 1/00
(52) U.S. Cl. ........................ 315/291; 315/224; 347/247; 347/238; 347/246
(58) Field of Search ............................... 315/169.3, 224, 315/291; 347/236, 238, 246, 247; 355/35, 37

(56) References Cited

U.S. PATENT DOCUMENTS

| | | | |
|---|---|---|---|
| 5,130,524 A | * | 7/1992 | Egawa et al. ............... 250/205 |
| 5,812,174 A | * | 9/1998 | Noguchi et al. ............ 347/237 |
| 6,549,265 B1 | * | 4/2003 | Sakakibara et al. ........... 355/35 |

* cited by examiner

Primary Examiner—Haissa Philogene
(74) Attorney, Agent, or Firm—Rader, Fishman & Grauer PLLC; Ronald P. Kananen

(57) ABSTRACT

If an abnormal current is applied to a laser diode at the rise time and fall time of a power voltage, a laser diode's life may be shortened. In a laser diode drive, circuits monitoring a current voltage are set up in two systems. At the same time, the monitor voltage of one system that controls the on/off operation of the internal bias voltage is set high relative to a monitor voltage of the other system controlling an output current; until the internal bias voltage becomes stable when power is on and before the internal bias voltage cuts off and makes the circuit operation unstable when power is off, by giving another reference voltage in lieu of a reference voltage as the reference voltage of the voltage-current conversion circuit, the output status of the voltage-current conversion circuit is controlled in the direction of decreasing a current that is applied to the laser diode, so that the laser diode is prevented from receiving an abnormal current at the rise time of the power voltage.

9 Claims, 4 Drawing Sheets

F I G. 1
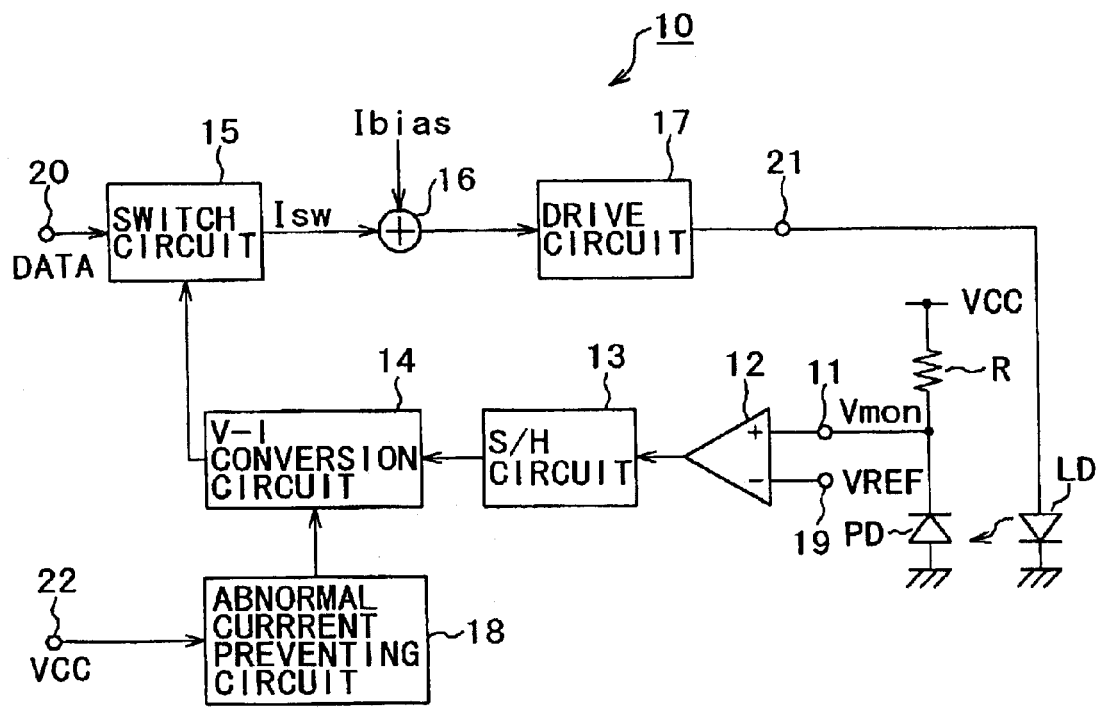

LIGHT EMITTING DEVICE DRIVE AND IMAGE FORMING APPARATUS

CROSS REFERENCE TO RELATED APPLICATIONS

This application claims priority to Japanese Patent Application No. JP 2002-095083, filed on Mar. 29, 2002, the disclosure of such application being herein incorporated by reference to the extent permitted by law.

BACKGROUND OF THE INVENTION

1. Field of the Invention

The present invention relates to a light emitting device and an image forming apparatus and, particularly, to a drive driving a light emitting device, such as a laser diode (semiconductor laser), and an image forming apparatus such as a laser printer and a copying machine mounted with a laser diode as a light source.

2. Description of the Related Art

One type of a light emitting device, for example, a laser diode, has a characteristic in which an optical output arises at a threshold current (oscillation start current) Ith as input current is permitted to increase. When an active region is small, the threshold current Ith is small. Further, the higher the laser diode temperature, the larger the threshold current Ith becomes, so that the ratio of increase of light power decreases above a certain temperature.

The lifetime of a laser diode is typically supposed to be longer when it is used under low temperature. Also, its life is subject to deterioration due to degradation inside a crystal, oxidation on the edge surface of the crystal, and the like.

SUMMARY OF THE INVENTION

It is known that a laser diode is vulnerable to a surge current. Especially, at the rise time or fall time of a power voltage of a drive, the circuit condition is in an unstable state; hence, there is a good possibility of an abnormal current flowing into a laser diode. Consequently, particularly in the case of a drive of a current output type, it is necessary to arrange for ways to ensure that at the rise time or fall time of the power voltage, an abnormal current being applied to the laser diode will not shorten the lifetime of the laser diode.

In light of the above-mentioned problem, the present invention is directed to meeting a need of providing a light emitting device drive which will not let an abnormal current run through a drive device at the rise or fall time of the power voltage and an image forming apparatus using such a device for driving a laser diode which is its light source.

A light emitting device drive according to a preferred embodiment of the present invention includes a current output circuit outputting a current to supply to a light emitting device, first detection means for detecting a power voltage exceeding a first monitor voltage, internal bias supply means taking an operating status in response to a detecting output of said first detection means and supplying an internal bias to internal circuits including said current output circuit, second detection means for detecting that the power voltage exceeds a second monitor voltage higher than the first monitor voltage, and control means for controlling an output status of said current output circuit in a way to decrease a current to be applied to said light emitting device during a period of time between a detecting time by said first detection means and a detecting time by said second detection means. The light emitting device drive is used as a drive of a laser diode in an image forming apparatus using the laser diode as a light source.

In a light emitting drive according to the above mentioned configuration, when the first detection means detects that the power voltage exceeds the first monitor voltage, upon receipt of a detecting output, internal bias supply means takes an operating status and supplies an internal bias to the internal circuits including the current output circuit.

Further, when the second detection means detects that the power voltage exceeds the second monitor voltage, upon receiving a detecting output, the current output circuit starts outputting a current to a light emitting device.

Still further, during the period of time between the time of detection by the first detection means and the time of detection by the second detection means, that is, while an internal bias is unstable at the rise time and fall time of the power voltage, the control means prevents an abnormal current from flowing into a light emitting device by controlling the output condition of the current output circuit in terms of decreasing the current to be applied to a light emitting device.

According to the preferred embodiment of the present invention, as mentioned above and to be described in more detail below, two systems of circuits monitoring the voltage current VCC are established; at the same time, the monitor voltage of one system that controls the on/off operation of the internal bias voltage is set high relative to a monitor voltage of the other system controlling an output current. In addition, by controlling the output status of the voltage-current conversion circuit in the direction of decreasing a current to be applied to the laser diode LD before the internal bias voltage becomes stable when the power is on, and before the internal bias voltage cuts off to make the circuit operation unstable when the power is off, it is possible to prevent reliably an abnormal current from flowing into the laser diode LD at the rise time or fall time of the power voltage. Consequently, a major contribution can be made to a longer lifetime for the laser diode LD.

BRIEF DESCRIPTION OF THE DRAWINGS

The above and other features and advantages of the present invention will become more apparent from the following description of the presently exemplary preferred embodiments of the present invention taken in conjunction with the accompanying drawings, in which:

FIG. 1 is a block diagram showing a configuration of a light emitting device drive according to a preferred embodiment of the present invention;

DETAILED DESCRIPTION OF THE PREFERRED EMBODIMENTS

Figure 2:
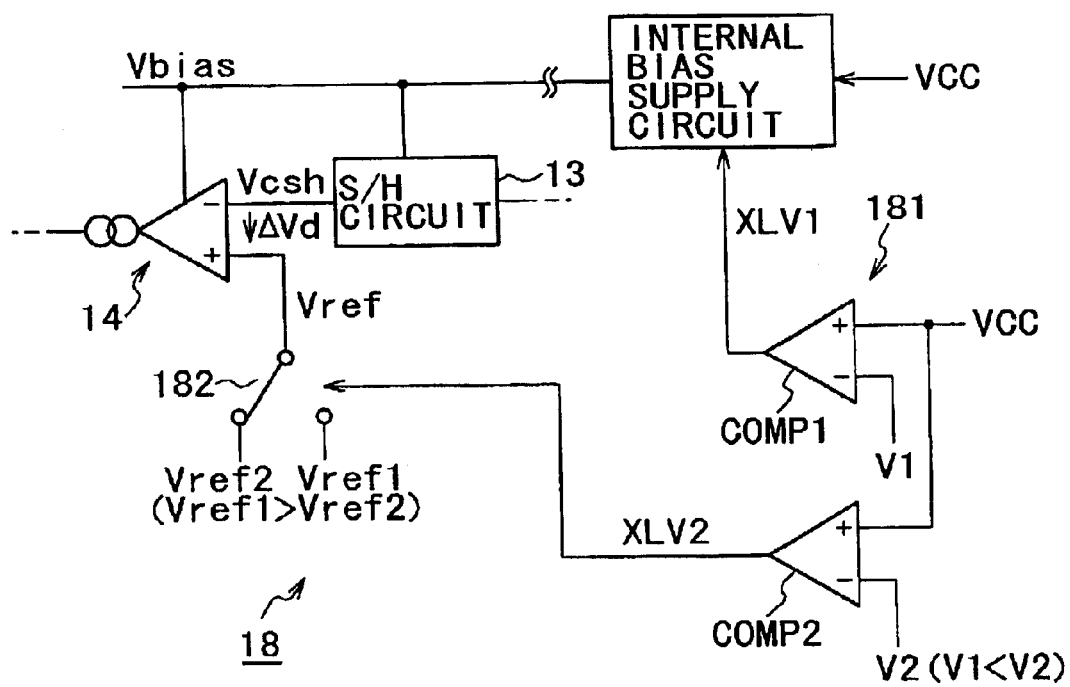
FIG. 2 is a block diagram showing an example of a configuration of an abnormal output preventing circuit.

Preferred embodiments according of the present invention will now be described in detail below with reference to the accompanying drawings.

FIG. 1 is a block diagram showing an overall configuration of a light emitting device drive according to a preferred embodiment of the present invention. In this drawing, a light emitting device to be driven, for example, a laser diode LD, is presented as an example and described.

Since an optical output-forward current characteristic of the laser diode LD fluctuates due to temperature change and degradation due to aging, in the laser diode drive, control to stabilize an oscillation output of the laser diode LD at all times, that is, APC (Automatic Power Control), is typically performed. An optical output of the laser diode LD is received by a photodiode PD, and based on an optical receiving output, APC is performed.

Specifically, in FIG. 1, resistance R is serially connected to a photodiode PD between a power VCC and a gland. The optical output of the laser diode LD is subjected to photoelectric conversion by the photodiode PD, and a current obtained from the photoelectric conversion is converted to voltage (hereinafter referred to as "Monitor Voltage") by the resistance R and applied to the present laser diode drive 10 via a monitor terminal 11.

The laser diode drive 10 is constituted by a comparator 12, a sample hold (S/H) circuit 13, a voltage-current (V-I) conversion circuit 14, a switch circuit 15, a current adder 16, a drive circuit 17, and an abnormal output preventing circuit 18. For example, it is made into an IC as a current output driver IC and used.

The comparator 12 treats a monitor voltage Vmon of the photo diode PD applied via a monitor terminal 11 as a non-inverting (+) input, compares it with a reference voltage Vref1 provided from outside via a reference input terminal 19-1 as an inverting (−) input, and outputs its differential voltage. The sample hold circuit 13-1 samples and holds a differential voltage outputted from the comparator 12.

The voltage-current conversion circuit 14 is a current output circuit, which converts a hold voltage of the sample hold circuit 13 into a current and outputs it. For example, it is configured by a gm amplifier. A current outputted from the voltage-current conversion circuit 14, that is, a current corresponding to a differential of the monitor voltage Vmon relative to a reference voltage VRE, is supplied to the switch circuit 15.

The switch circuit 15 performs on/off switching corresponding to data input via a data input terminal 20 and provides a switching current IBW corresponding to a current 11 supplied from the voltage-current conversion circuit 14 to the current adder 16 as an addition input on one side.

Supposing a step current is applied to a laser diode, a laser oscillation arises after a certain lapse of time. In other words, a time delay or oscillation delay is generated for the laser oscillation. To shorten this oscillation delay in driving a laser diode, a technique of applying constantly a bias current is typically employed. Then, the current adder 16 treats the bias current Ibias as an addition input on the other side and supplies an output current obtained by adding the switching current Isw to a drive circuit 17.

The drive circuit 17, upon supplying a drive current corresponding to a current supplied from the current adder 16 to an anode of the laser diode LD, drives the laser diode LD. At this event, a loop including the photodiode PD→, the comparator 12→, the sample hold circuit 13→, the voltage-current conversion circuit 14→, the switch circuit 15→, the current adder 16→, the drive circuit 17→, and the laser diode LD becomes an APC loop to perform control for stabilizing an oscillation output of the laser diode LD.

The laser diode drive 10 according to the present embodiment of the invention is further provided with an abnormal output preventing circuit 18 which monitors the power voltage VCC input via a power terminal 22 and prevents an abnormal current from being applied into the laser diode LD at the rise time and fall time of the power voltage VCC.

FIG. 2 shows an example of a configuration of the abnormal output preventing circuit 18. As is apparent from the drawing, each internal circuit including the sample hold circuit 13 and the voltage-current conversion circuit 14 is so designed that from an internal bias supply circuit 23, an internal bias voltage Vbias generated based on the power voltage VCC in the internal bias supply circuit 23 is supplied thereto.

The abnormal output preventing circuit 18 of the present example includes a power monitor circuit 181 monitoring the power voltage VCC and a changeover switch 182, which selects and provides either of two reference voltages Vref1 and Vref2 with different voltages to the voltage-current conversion circuit 14 comprised of the gm amplifier as a reference voltage Vref. The power monitor circuit 181 is constituted by a comparator COMP1 detecting that the power voltage VCC exceeds a first monitor voltage V1 and a comparator COMP2 detecting that the power voltage VCC exceeds a second monitor voltage V2.

The comparator COMP1 compares the power voltage VCC with the monitor voltage V1 and outputs a detection signal XLV which reaches a high level at the rise time of the power voltage VCC when the power voltage VCC exceeds the monitor voltage V1. Further, the comparator COMP1 has a hysteresis property, so that at the fall time of the power voltage VCC, when the power voltage VCC falls below a monitor voltage V1' which is lower than the monitor voltage V1 by a preset voltage $\Delta\alpha$, the detection signal XLV1 is at a low level.

The detection signal XLV1 outputted from the comparator COMP1 is supplied to the internal bias supply circuit 23 as its on/off control signal. The internal bias supply circuit 23 is in operating status (ON) when the detection signal XlV1 is at a high level, supplying the internal bias voltage Vbias to each internal circuit including the sample hold circuit 13 and the voltage-current conversion circuit 14. When the detection signal XLV1 is at a low level, it is in non-operating status and stops supplying the internal bias voltage Vbias. In other words, the monitor voltages V1 and V1' become threshold voltages that perform on/off control of the internal bias supply circuit 23.

On the other hand, the comparator COMP2 compares the power voltage VCC with the second monitor voltage V2 (V1<V2) which is higher than the first monitor voltage V1, at rise time of the power voltage VCC, and outputs a detection signal XLV2 which becomes the high level when the power voltage VCC exceeds the monitor voltage V2.

Further, the comparator COMP2 has a hysteresis property in the same way as the comparator COMP1, so that at the fall time of the power voltage VCC, when the power voltage VCC falls below a monitor voltage V2' which is lower than the monitor voltage V2 by a preset voltage $\Delta\beta$, the detection signal XLV2 is at the low level The detection signal XLV2 outputted from the comparator COMP2 is supplied to the changeover switch 182 as its changeover control signal. The changeover switch 182 functions as control means for controlling the output status of the voltage-current conversion circuit 14 based on the detection signal XLV2.

Specifically, when the detection signal XLV2 is at the low level, a first reference voltage Vref1 is selected and provided to the voltage-current conversion circuit 14 as its reference voltage Vref; when the detection signal XCLV2 is at the high level, a second reference voltage Vref2 (Vref1>Vref2), whose voltage is set lower than the first reference voltage Vref1, is selected and provided to the voltage-current conversion circuit 14 as its reference voltage Vref. In other words, the monitor voltages V2 and V2' are threshold voltages that control the output status of an output current of the voltage-current conversion circuit 14.

At this event, the voltage-current conversion circuit 14 employs the reference voltage Vref2 as its reference voltage Vref when controlling the quantity of light of the laser diode LD in the APC group, outputting a current corresponding to a differential voltage $\Delta Vd$ relative to the reference voltage Vref2 of a hold voltage Vcsh of the sample hold circuit 13.

The first reference voltage Vref1 is set high relative to the second reference voltage Vref2 which is used as the reference voltage Vref at the APC time. Note that since the comparators COMP 1 and COMP 2 have the hysteresis property, a malfunction due to chattering when the power is turned on/off can be prevented.

Figure 3:
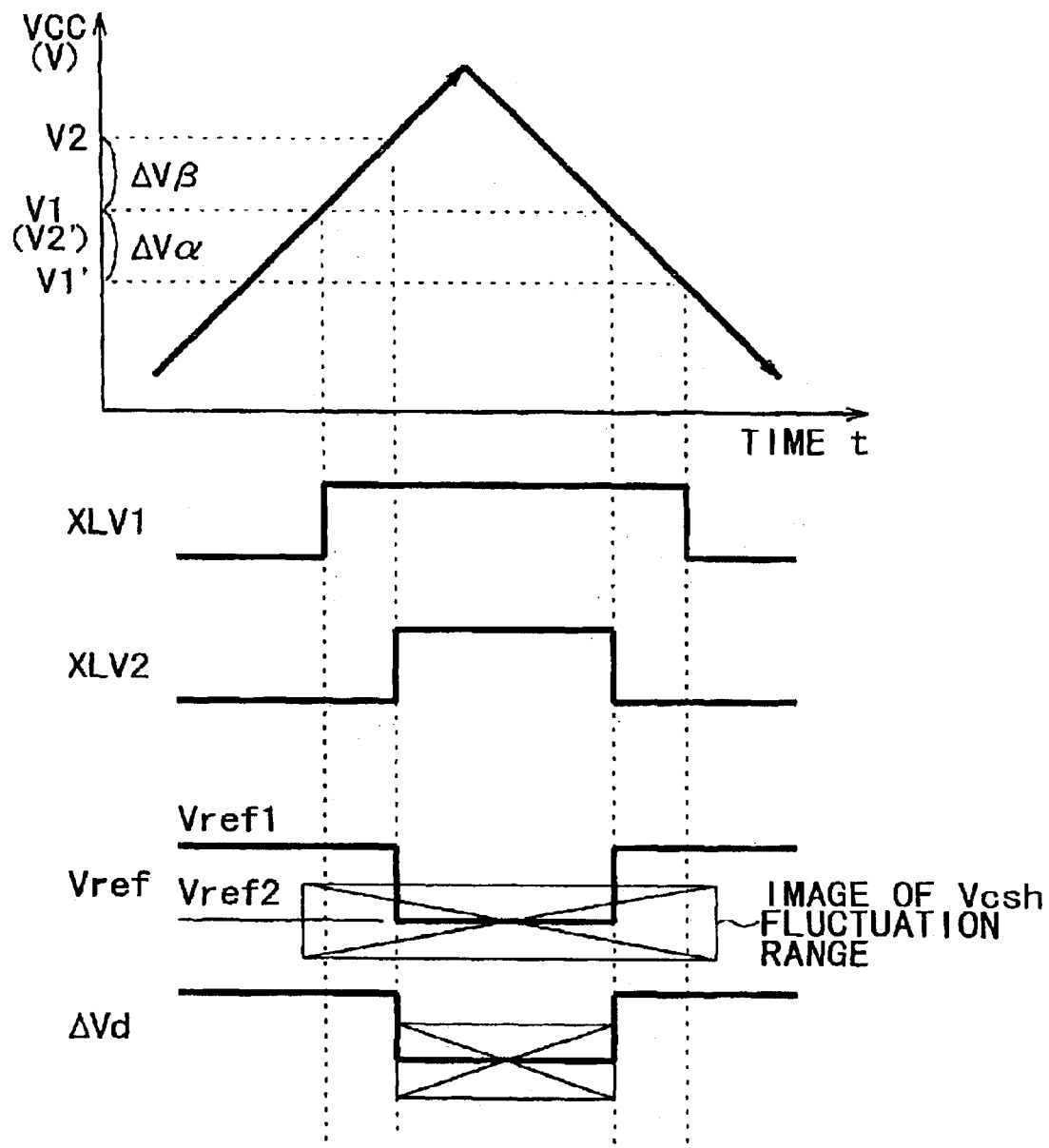
FIG. 3 is a waveform diagram explaining the circuit operation of an abnormal output preventing circuit.

FIG. 3 shows relationships among the power voltage VCC and the monitor voltages V1, V1', V2, and V2', and also illustrates each waveform of the detection signals XLV1 and XLV2 and the reference voltage Vref (Vref1/Vref2).

Next, circuit operation of the abnormal output preventing circuit 18 of the above-mentioned configuration will be described with reference to the waveform diagrams of FIG. 3.

First, at the rise time of the power voltage VCC, the power voltage VCC increases, and upon reaching the first monitor voltage V1, the comparator COMP1 outputs a high-level detection signal XLV1. Upon receipt of this high-level detection signal XLV1, the internal bias supply circuit 23 is turned on, starting to supply the internal bias voltage Vbias to each internal circuit including the sample hold circuit 13 and the voltage-current conversion circuit 14.

At this event, since the power voltage VCC is short of the second monitor voltage V2, the detection signal XLV2 outputted from the comparator COMP2 is at the low level. Accordingly, the changeover switch 182 selects a reference voltage Vref1 and provides it to the voltage-current conversion circuit 14 as its reference voltage Vref. Since the value of the reference voltage Vref1 is set higher than the value of the reference voltage Vref2, the reference voltage Vref of the voltage-current conversion circuit 14 is lifted by compulsion, causing the enlargement of a differential voltage relative to the reference voltage Vref of the hold voltage Vcsh of the sample hold circuit 13 ($\Delta Vd > 0$). As a result, the voltage-current conversion circuit 14 operates in the direction of decreasing an output current.

In other words, at the rise time of the power voltage VCC, until the power voltage VCC reaches the second monitor voltage V2, the first reference voltage Vref2 is provided as the reference voltage Vref of the current conversion circuit 14. By compulsively lifting the reference voltage Vref, the output status of the voltage current conversion circuit 14 will be controlled in the direction of decreasing a current to be applied to a laser diode LD, that is, in the direction of sucking the current. By means of this control of the output status of the voltage-current conversion circuit 14, a current being applied to the laser diode LD finally decreases.

When the power voltage VCC further rises to the second monitor voltage V2, the comparator COMP2 outputs a high-level detection signal XLV2. Upon receipt of this high-level detection signal XLV2, the changeover switch 182 selects the reference voltage Vref2 in lieu of the reference voltage Vref1 and provides it to the voltage-current conversion circuit 14 as its reference voltage Vref. The reference voltage Vref2 is the reference voltage Vref at the time of APC operation, so that voltage-current conversion is thereafter carried out based on the reference voltage Vref2 in the voltage-current conversion circuit 14.

Specifically, when the hold voltage Vcsh of the sample hold circuit 13 is less than the reference voltage Vref2, that is, a differential voltage $\Delta Vd$ larger than 0 (>0), the voltage-current conversion circuit 14 applies a current which is in agreement with the voltage of $\Delta Vd$ in the direction of decreasing the output current.

On the other hand, when the hold voltage Vcsh of the sample hold circuit 13 is larger than the reference voltage Vref2, that is, a differential voltage $\Delta Vd$ less than 0 (0<), the voltage-current conversion circuit 14 applies a current which is in agreement with the voltage of $\Delta Vd$ in the direction of increasing the output current.

The above-mentioned explanation covers the circuit operation of the abnormal output preventing circuit 18 at the rise time of the power voltage VCC. Now, the circuit operation of the abnormal output preventing circuit 18 at the fall time of the power voltage VCC will be described below.

As power is turned off, the power voltage VCC falls below the second monitor voltage V2', and the comparator COMP2 outputs a low-level detection signal XLV2. Upon receipt of this low-level detection signal XLV2, the changeover switch 182 selects the reference voltage Vref1 in lieu of the reference voltage Vref2 and provides it to the voltage-current conversion circuit 14 as its reference voltage Vref. This lifts the reference voltage Vref of the voltage-current conversion circuit 14 by compulsion, causing the enlargement of a differential voltage ($\Delta Vd > 0$). As a result, the voltage-current conversion circuit 14 operates in the direction of decreasing an output current.

As the power voltage VCC further falls below the first monitor voltage V1', the comparator COMP1 outputs a low-level detection signal XLV1. Upon receipt of this low-level detection signal XLV1, the internal bias supply circuit 23 is turned off, thus stopping the supply of the internal bias voltage Vbias to each internal circuit including the sample hold circuit 13 and the voltage-current conversion circuit 14.

As mentioned above, the flow of an abnormal current can be prevented from flowing into a laser diode LD at the rise time of the power voltage VCC in the following way: two systems of circuits monitoring the voltage current VCC in a light emitting device, for example, a laser diode drive, are set; at the same time, the monitor voltage V1 of one system that controls the on/off switching of the internal bias voltage Vbias is set high relative to the monitor voltage V2 of the other system controlling an output current, and the output status of the voltage-current conversion circuit 14 is controlled in the direction of decreasing the current to be applied to the laser diode LD until the internal bias voltage Vbias stabilizes when the power is on.

Further, by controlling the output status of the voltage-current conversion circuit 14 in the direction of decreasing a current to be applied to the laser diode LD before the internal bias voltage Vbias cuts off to make the circuit operation unstable when the power is off, it is possible to prevent an abnormal current from being applied to the laser diode LD at the fall time of the power voltage VCC. Especially, when the power is off, the hold voltage Vcsh of the sample hold circuit 13 is determined by an electric charge accumulated in the capacitor, hence, it is impossible to control the hold voltage Vcsh instantaneously. Consequently, by increasing the reference voltage Vref, an abnormal current can be reliably prevented from flowing into a laser diode LD.

In this manner, even though the circuit operation is in an unstable status when the power is on or off, by preventing reliably an abnormal current from flowing into a laser diode LD, major contribution can be made to a longer life for a laser diode LD. Particularly, a preferred embodiment of the present invention is based on a system of controlling the output status of the voltage-current conversion circuit 14 by lifting the reference voltage Vref (shifting). In terms of circuit construction, neither modification nor alteration is required of the voltage-current conversion circuit 14; therefore, a simple configuration is sufficient to meet the need as mentioned.

The example of the preferred embodiment of the present invention mentioned above has been described by illustrating a case of driving a laser diode as a light emitting device. However, it is in by no means limited to a laser diode but is especially applicable to current-driven light emitting devices in general.

A light emitting drive according to the preferred embodiment of the present invention as mentioned above is most suitable for use as a drive of a laser diode mounted on an image forming apparatus such as a laser printer and a copying machine as its light source.

Figure 4:
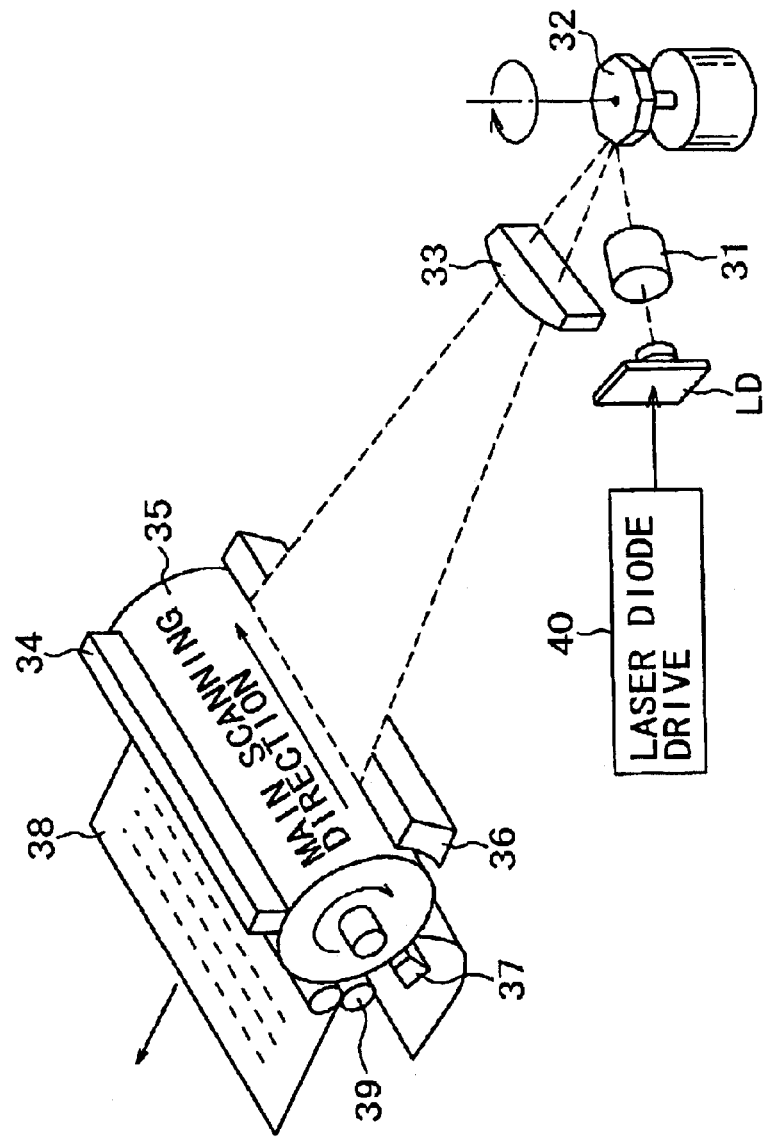
FIG. 4 is a schematic perspective view showing a basic configuration of a laser printer according to a preferred embodiment of the present invention.

FIG. 4 is a schematic perspective view of an image forming apparatus according to a preferred embodiment of the present invention, for example, showing a basic construction of a laser printer. In FIG. 4, a laser beam emitted from a laser diode LD passes a collimator lens 31, then enters an fθ lens 33 while being scanned by a polygon mirror in the main scanning direction, and is irradiated on a photosensitive drum 35 that is subjected to corona charging by a charger 34, thereby exposing an original image and forming a latent image on the photosensitive drum 35.

The photosensitive drum 35, through rotation, carries out vertical scanning. A latent image formed on the photosensitive drum 35 by an electric charge pattern is made into a visible image by development through a developer 37. This apparent toner image is transcribed onto a form 38 by a transcriber 37. The transcribed toner image is fixed to the surface of the form 38 by a fixation device 39.

In an image forming apparatus represented by a laser printer of the above-mentioned construction, as a drive 40 of a laser diode LD, a laser diode drive of a preferred embodiment mentioned above is employed. By this means, it is possible for the laser diode drive to prevent reliably an abnormal current from flowing into a laser diode LD, even when the circuit operation is in an unstable state with the power on or off, thus contributing greatly to a longer life of the light source. Especially when an image forming apparatus is a copying machine, there is employed a construction which cuts off power to keep a laser diode from emitting light abnormally when the cover is opened during the copying process, so that the present invention can prevent an abnormal current from flowing into a laser diode even at that time when the power is off.

While the present invention has been described in its preferred embodiments, it is to be understood that the invention is by no means limited to such preferred embodiments. Accordingly, any modifications, variations, combinations and sub-combinations of the present invention are possible in light of the above teachings. It is therefore to be understood that within the scope of the appended claims, the present invention may be practiced otherwise than as specifically described.

What is claimed is:

1. A light emitting device drive comprising:
   a current output circuit for outputting a current to be supplied to a light emitting device;
   a first detection means for detecting a power voltage when exceeding a first monitor voltage;
   an internal bias supply means for supplying an internal bias to an internal circuit including said current output circuit, wherein said internal bias supply means becomes operational in response to a detecting output from said first detection means;
   a second detection means for detecting said power voltage when exceeding a second monitor voltage which is higher than said first monitor voltage; and
   a control means for controlling an output status of said current output circuit so as to decrease a current applied to said light emitting device during a period of time between the time of detection by said first detection means and the time of detection by said second detection means.

2. A light emitting device drive according to claim 1, wherein said first detection means detects said power voltage when said power voltage reaches said first monitor voltage at a time said power voltage rises and when said power voltage has a monitor voltage which is below said first monitor voltage at a time said power voltage falls.

3. A light emitting device drive according to claim 1, wherein said second detection means detects said power voltage when said power voltage reaches said second monitor voltage at a time said power voltage rises and when said power voltage has a monitor voltage below said second monitor voltage at a time said power voltage falls.

4. A light emitting device drive according to claim 1, wherein when said current output circuit is related to a control loop that detects an optical output of said light emitting device and controls said optical output of said light emitting device based on a differential voltage of said detected output relative to a reference voltage, said current output circuit comprises a voltage-current conversion circuit that converts said differential voltage into a current and outputs said current.

5. A light emitting device drive according to claim 1, wherein said light emitting device comprises a laser diode.

6. An image forming apparatus having a laser diode as a light source and a drive for driving the laser diode, said drive comprising:
   a current output circuit for outputting a current to be supplied to said laser diode;
   a first detection means for detecting a power voltage when said power voltage exceeds a first monitor voltage;
   an internal bias supply means for supplying an internal bias to an internal circuit including said current output circuit, wherein said internal bias supply means becomes operational in response to a detecting output from said first detection means;
   a second detection means for detecting said power voltage when said power voltage exceeds a second monitor voltage which is higher than said first monitor voltage; and
   a control means for controlling an output status of said current output circuit in a direction of decreasing a current applied to said light emitting device during a period of time between the time of detection by said first detection means and the time of detection by said second detection means.

7. An image forming apparatus according to claim 6, wherein said first detection means detects said power voltage when said power voltage reaches said first monitor voltage at a time said power voltage rises and when said power voltage has a monitor voltage which is below said first monitor voltage at a time said power voltage falls.

8. An image forming apparatus according to claim 6, wherein said second detection means detects at a rise time of said power voltage that said power voltage has reached said second monitor voltage and detects at a falling time of said power voltage that said power voltage has reached a monitor voltage which is below said second monitor voltage.

9. An image forming apparatus according to claim 6, wherein when said current output circuit is related to a control loop that detects an optical output of said light emitting device and controls said optical output of said light emitting device based on a differential voltage of said detected output relative to a reference voltage, said current output circuit comprises a voltage-current conversion circuit that converts said differential voltage into a current and outputs said current.

* * * * *